United States Patent [19]

Honse

[11] 4,307,531
[45] Dec. 29, 1981

[54] SIMULATED FISH SKIN AND FISHING LURE

[76] Inventor: James A. Honse, MOQ BB 20, Courthouse Bay, Camp Lejeune, N.C. 28542

[21] Appl. No.: 42,412

[22] Filed: May 25, 1979

[51] Int. Cl.³ ............................................. A01K 85/00
[52] U.S. Cl. ..................................... 43/42.32; 43/42.24
[58] Field of Search .................. 43/42.24, 42.32, 42.33, 43/42.34, 42.28, 42.35

[56] References Cited

U.S. PATENT DOCUMENTS

| | | | |
|---|---|---|---|
| 1,473,420 | 11/1923 | Doering | 43/42.32 |
| 1,489,043 | 4/1924 | Reinewald | 43/42.29 |
| 1,569,993 | 1/1926 | MacLeod | 43/42.34 X |
| 2,124,152 | 7/1938 | Salm | 43/42.32 |
| 2,350,572 | 6/1944 | Schweigert | 43/42.33 |
| 2,933,847 | 4/1960 | Frasure | 43/42.33 |
| 3,122,853 | 3/1964 | Koonz | 43/42.33 |
| 3,186,120 | 6/1965 | Layson | 43/42.33 X |
| 3,863,378 | 2/1975 | Walker | 43/42.28 |
| 4,176,490 | 12/1979 | Philips | 43/42.33 |
| 4,199,888 | 4/1980 | Barnes | 43/42.33 |

FOREIGN PATENT DOCUMENTS

| | | | |
|---|---|---|---|
| 537831 | 3/1957 | Canada | 43/42.35 |
| 281100 | 12/1927 | United Kingdom | 43/42.33 |

Primary Examiner—Stephen G. Kunin
Assistant Examiner—Robert P. Olszewski
Attorney, Agent, or Firm—Joseph P. Nigon

[57] ABSTRACT

A simulated fish skin impervious to the elements having the flexibility, shape, reflective quality, iridescence and other general features of the particular fish species desired prepared by sandwiching a thin, shiny material with an embossed surface between layers of a clear, flexible plastic joined together at the periphery of the fish skin representation. The structure can be made more lifelike by coloring in the appropriate areas with India inks or other suitable dye material.

7 Claims, 6 Drawing Figures

SIMULATED FISH SKIN AND FISHING LURE

BACKGROUND OF THE INVENTION

I. Field of the Invention

This invention relates to the manufacture of a new product, artificial fish skin, to be used as the substitute for prepared whole natural bait fish or bait fish parts, or decorations attached to fishing lures. The product also finds utility as an item of fashion where the particular properties of the product are desired.

II. Prior Art

The prior art exhibits a large number of structures for fishing lures that are employed to simulate natural bait. The vast majority of these products are prepared to be rigid structures such as plugs, etc. U.S. Pat. No. 3,861,073 describes a flexible fishing lure. The essential feature of this product resides in the shape of the portion the inventor describes as the membrane portion and in the presence of the ridges in the periphery of the membrane portion of the structure. Other fishing lures that are more typical of the prior art include U.S. Pat. No. 3,540,144 to Gurka which describes a two-piece oval-shaped solid lure with an embossed insert therein. U.S. Pat. No. 3,631,625 to Castner describes another solid lure made of a transparent material that has spaced polarizing films embedded therein. U.S. Pat. No. 3,528,189 to Lilley, Jr., discloses a solid fishing lure that includes a photograph in the interior of the oval-shaped structure.

SUMMARY OF THE INVENTION

The present invention comprises a simulated fish skin that is a substantial improvement over the patented and unpatented prior art. The skin is characterized by its flexibility and its close resemblance to natural fish skins. The product may be a two or three-piece flexible laminate or may be in the form of a combination of two of these laminae. In another embodiment of the invention the head portion of the structure may be a solid molded portion with the flexible fish skin attached thereto.

For purposes of simplicity, my invention will be described with reference to items useful in a sport and commercial fishing. However, it is obvious that the material might also find several other uses; such as in the fashion industry, for example, where it is desirable to have a material with an iridescent appearance.

My novel simulated fish skins provide the lure maker or the fisherman with a new decoration for lures that can replace items such as the popular squid-like skirts with flexible fin fish representations. Other applications will be obvious to fishermen and lure makers.

DETAILED DESCRIPTION OF THE INVENTION

The present invention comprises a simulated fish skin that simulates the appearance of natural fish, and when combined or formed into a lure simulates the movement of a natural fish. The present invention utilizes a laminate of flexible materials. The preferred structure comprises outer sheets of transparent plastic material with a thin, shiny sheet, with an embossed surface of numerous scale simulating facets for the reflection of light, positioned between the outer transparent plastic members. The plastic members are integrated in any suitable fashion such as with an adhesive, heat-sealing, stitching, etc.

The material used for the covering members of the simulated fish skin should have the following properties: (1) it should be clear (preferably transparent); (2) it should be suitable for film-forming and/or extrusion; (3) it should be completely flexible; (4) it should preferably be suitable for heat-sealing; (5) it should have a price which is not prohibitive. Examples of suitable materials with their heat-sealing temperatures include:

| Material | Heat-Sealing Temperature |
|---|---|
| Polyvinylchloride | 250°–350° F. |
| Medium density polyethylene | 250°–400° F. |
| High density polyethylene | 260°–425° F. |
| Polypropylene | 260°–350° F. |
| Polycarbonate | 350°–400° F. |
| Fluorinated ethylene | 575°–700° F. |
| Vinyl fluoride | 400°–425° F. |
| Polytrifluorochloroethylene | 325°–375° F. |

Another material that may be suitable under certain conditions is a linear polymeric ethylene glycol terephthalate product that is available under the tradename of "Mylar". This material heat-seals between 325° and 450° F.

As pointed out above, the periphery of the covering members of my simulated fish skin may also be joined by stitching or with adhesive compositions. The most critical feature of the film used to form these cover members is its flexibility. The film should be of a thickness such that it is completely flexible.

The center portion of my simulated fish skin can be any material that is thin, shiny and has an embossed surface of numerous scale simulating facets for the reflection of light. Examples of suitable materials include metal foils such as aluminum, for instance. A particularly suitable material is a commercially available metallized Mylar material that has the desired embossed surface. However, a less reflective decorative material may be used when simulating the skins of fishes having other than the aforementioned characteristics.

It is therefore an object of the invention to eliminate the need for the use of natural fin fish baits and to eliminate the effort required by fishermen preparing for rigging such bait fish for the purpose of luring game or food fish to the hook. This objective is accomplished by providing those so employed with a superior structure suitable to their needs. The structure can be manufactured simply and at a reasonable cost. The structure equals for is superior to those desirable qualities in a natural fish bait when fresh, frozen or otherwise preserved, such as reflectiveness, flexibility, iridescence and durability. It requires little or no preparation prior to rigging with hooks, lines, weights or other articles used by those knowledgeable in the art of bait rigging. It is apparent that the exceptional features of the structure will encourage new bait rigging methods.

Another object of the invention is to provide the fishing lure maker or the angler with a durable fin fish like decoration that can be attached to those items of hardware that provide a swimming, wobbling, darting, popping, wiggling or other lifelike or attention-gaining action. Examples of these items include plugs, heads, spoons and bubblers.

An additional object of the invention is to provide the world of fashion with a decorative fabric to be used in items of accessory, items of clothing, furnishings and works of art.

DETAILED DESCRIPTION OF THE DRAWINGS

Figure 1:
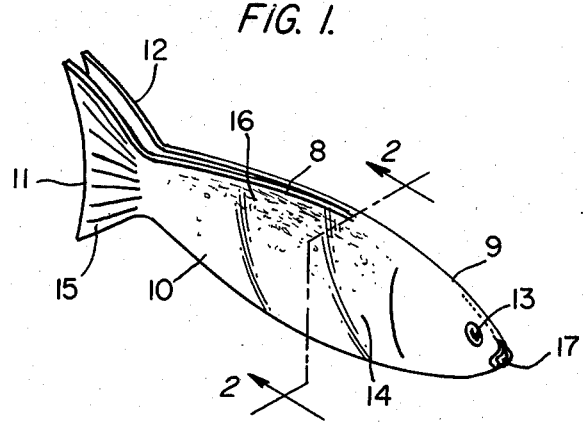
FIG. 1 is a perspective view of one of the preferred embodiments of my invention.

Referring now to FIG. 1 which shows the "skirt" embodiment 10 of the invention which is in the shape of a bait fish, the forward portion 9 is joined in a manner such that it presents only one outer and one inner surface. The rear portion 8, however, is joined in a manner such that there are two separate portions 11 and 12. The appropriate layers are covered with identifying markings and typical features such as eyes 13, spots 14, fins 15, and color differences 16. The structure also has an aperture 17 to facilitate insertion of a leader in the preparation of the structure for fishing.

Figure 2:
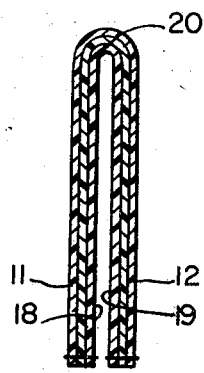
FIG. 2 is a cross-sectional view taken along lines 2—2 of FIG. 1.

Referring now to FIG. 2 which is a cross-section along lines 2—2 of FIG. 1 to show certain of the structural features. The exterior portions of the structure 11, 12 cover the central portion 20 which is an embossed surface with the interior portions 18 and 19 and are of a clear flexible plastic material.

Figure 3:
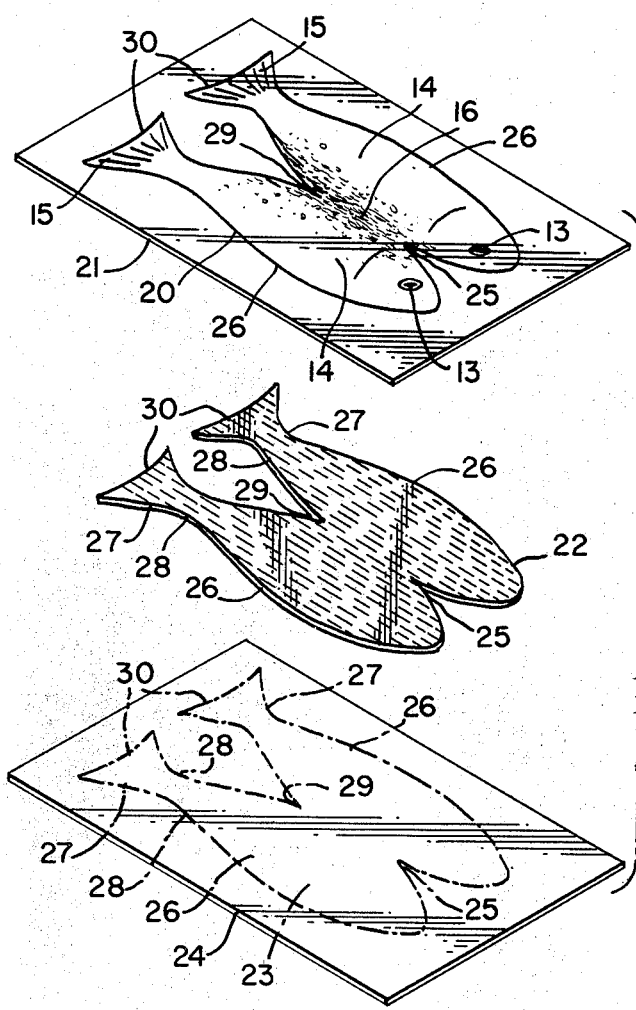
FIG. 3 graphically shows the steps in the manufacture of my fish skin product.

Referring now to FIG. 3, a pattern of a typical bait fish of the desired conformation and size is established on a sheet of clear, tinted or opaque flexible plastic material 21. Identifying markings and typical features such as eyes 13, spots 14, fins 15, and color differences 16 are applied to the plastic sheet 21 in the appropriate areas by means such as indelible ink or other fast dye materials. The same pattern is established on a sheet 22 of a thin, shiny material embossed with numerous scale simulating facets for the reflection of light. The flexible plastic material 21 is superimposed on the thin, shiny material 22 and appropriately positioned so that the patterns match. These two sheets are then positioned on the pattern in sheet 24 and the laminate folded over to form a simulated fish in the manner shown in FIG. 1. The edges of the laminate are joined from the area 25 to 26. The areas 27, 28, 29 and 30 are joined individually to form the structure shown in FIG. 1. It is obvious that the three layers may be severed in a line lying between numerals 25 and 29. In that case this area will be joined by stitching, heat-sealing, or with adhesives in action producing shapes.

Figure 4:
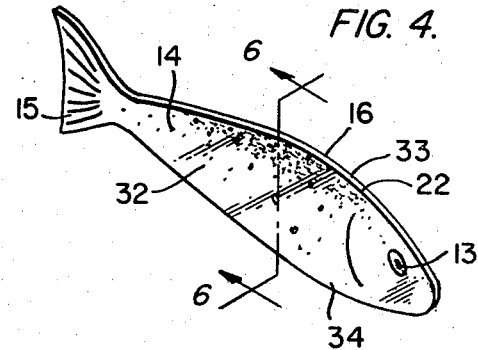
FIG. 4 shows another embodiment of my fish skin product.

Referring now to FIG. 4 which illustrates a simple embodiment of my invention. In this embodiment the structure consists of outer layers 32 and 33 enclosing the thin flexible embossed layer 22. The identifying markings, eyes 13, spots 14, fins 15, and color differences 16, are established on sheets 32 and 33 of the structure when desired.

Figure 5:
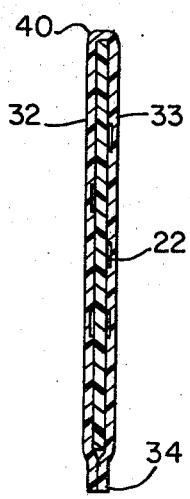
FIG. 5 is a cross-sectional view of the structure shown in FIG. 4 taken along lines 6—6.

FIG. 5 is a cross-sectional view of FIG. 4 taken along lines 6—6 and shows the inner and outer layers 32 and 33 of the clear plastic material forming a laminate with the thin flexible iridescent material 22. The product is joined at 34 by heat-sealing, adhesives, stitching, or in any other suitable manner. If the inner and outer layers 32 and 33 are prepared as separate patterns, it is obvious that the structure will be joined at 40 as well as at 34.

Figure 6:
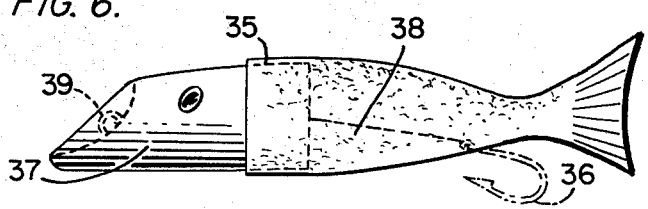
FIG. 6 shows another embodiment of my invention wherein my fish skin product is attached to a molded plastic lure head and shows one possible means of attaching a hook thereto.

FIG. 6 shows another embodiment of my invention on which a portion of my fish skin structure 35 is attached by means of adhesive, by friction or any other suitable manner to a commercially available molded plastic structure in the form of a fish head. This embodiment also discloses one suitable means for attaching a hook 36 to a leader 38 that extends to an attaching means 39 on the front of the simulated fish head.

As pointed out above the simulated fish head 37 is a commercially available item and is not part of this invention.

My simulated fish skin is completely flexible and provides the fishing lure maker or angler with a durable and fish like decoration. It is obvious from the structure shown in FIG. 6, for example, that the finished product can be attached to other commercially available items of hardware such as plugs, heads, spoons, bubblers, etc.

Although the structure shown in FIGS. 1 through 5 consists of three separate layers, it is obvious that the structure may include additional outer transparent plastic layers. Conversely, the thin flexible iridescent material can be attached by suitable means to a single layer of clear flexible material, both of which may have appropriate decorations applied thereto.

Although layers are joined at the edges in the prefered embodiments to maximize the characteristics of flexibility, it is obvious that the layers can be totally integrated.

Although the structure has been described as one in which the outer layers are transparent, it is obvious that these layers may be tinted or opaque particularly when the structure is used in the manufacture of fashion items as handbags, belts, shoes, etc.

Appendages for hooks and pockets for the insertion of real fish scraps (for smell) may be incorporated into the structures shown in the figures.

Obviously, many modifications and variations of the invention may be made without departing from the essence and scope thereof and only such limitations should be applied as are indicated in the appended claims.

What is claimed is:

1. A simulated fish skin lure comprising:
   (a) a forward portion and a rear portion having at least two outer layers and two inner layers of flexible plastic material bonded to each other and having representations of eyes, fins and spots thereon and
   (b) a flexible thin embossed iridescent material positioned between said outer and inner layers having scale simulating facets for reflecting light thereon, wherein the forward portion is joined to present only one outer and inner surface, and the rear portion is made up of two separate portions.

2. The simulated fish skin fishing lure of claim 1 wherein the outer layers are polyvinyl chloride and said inner layer is a flexible sheet of aluminum or metallized linear polymeric ethylene glycol terephthalate.

3. The simulated fish skin fish lure according to claim 1 wherein said outer layers are joined at the periphery thereof by stitching, adhesive bonding or heat-sealing.

4. A simulated fish skin lure comprising in combination a molded plastic structure in the shape of a simulated fish head and a flexible skirt portion in the shape of a portion of the body and the tail of a fish, said skirt portion being attached to the periphery of said simulated fish head, said skirt portion made up of outer and inner layers of plastic material bonded to each other with a flexible embossed iridescent material positioned between said outer and inner layers, said iridescent material having scale simulating facets for reflecting light thereon.

5. The simulated fish skin lure according to claim 4 wherein said second structure is adhesively attached to said molded plastic structure in the form of a simulated fish head.

6. The simulated fish skin lure according to claim 4 wherein the outer layers of said second structure are polyvinyl chloride and said inner layer is a flexible sheet of aluminum or metalized linear polymeric ethylene glycol terephthalate.

7. The simulated fish skin lure according to claim 4 wherein the outer layers of said second structure are joined at the periphery thereof by stitching, adhesive bonding or heat sealing.

* * * * *